(12) United States Patent
Bruno et al.

(10) Patent No.: US 8,601,126 B2
(45) Date of Patent: Dec. 3, 2013

(54) METHOD AND APPARATUS FOR PROVIDING FLOW BASED LOAD BALANCING

(75) Inventors: Aurelien Bruno, Nice (FR); Richard Duwiquet, La Colle sur Loup (FR); Nicolas Grisi, La Colle sur Loup (FR); Jean-Francois Le Pennec, Nice (FR)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1288 days.

(21) Appl. No.: 11/648,082

(22) Filed: Dec. 29, 2006

(65) Prior Publication Data

US 2008/0114892 A1 May 15, 2008

(51) Int. Cl.
*G06F 15/173* (2006.01)
(52) U.S. Cl.
USPC .......................... 709/226; 709/238; 709/241
(58) Field of Classification Search
USPC .................................. 709/223–229, 238–245
See application file for complete search history.

(56) References Cited

U.S. PATENT DOCUMENTS

| | | | |
|---|---|---|---|
| 7,154,858 B1 * | 12/2006 | Zhang et al. | 370/252 |
| 7,508,764 B2 * | 3/2009 | Back et al. | 370/235 |
| 2002/0065907 A1 * | 5/2002 | Cloonan et al. | 709/223 |
| 2003/0063611 A1 | 4/2003 | Schaub et al. | |
| 2003/0165137 A1 * | 9/2003 | Soloway et al. | 370/389 |
| 2003/0202511 A1 | 10/2003 | Sreejith et al. | |
| 2004/0136370 A1 * | 7/2004 | Moore et al. | 370/389 |
| 2005/0007954 A1 * | 1/2005 | Sreemanthula et al. | 370/229 |

OTHER PUBLICATIONS

French Search Report for FR 06/09786, dated Sep. 13, 2007, consists of 6 unnumbered pages.

* cited by examiner

*Primary Examiner* — Yasin Barqadle

(57) ABSTRACT

A method and apparatus for flow based load balancing are disclosed. For example, the present method receives at least one packet from a flow. If the flow has not being previously classified, then the flow is classified based on the characteristics of the flow. Once classified, the present method matches the flow to at least one matched path from a plurality of available paths in accordance with the characteristics of the flow and characteristics of the at least one matched path. Once matched, the present method forwards the packet from the flow to the at least one matched path for processing.

12 Claims, 6 Drawing Sheets

100

METHOD AND APPARATUS FOR PROVIDING FLOW BASED LOAD BALANCING

This application claims priority to French Patent Application No. 06/09786 filed Nov. 9, 2006 which is incorporated herein by reference in its entirety.

The present invention relates generally to optimal utilization of clustered resources, e.g., paths, computers, servers, networks, storage systems, firewalls, computing services, network services, and storage services and, in particular, to methods and apparatus for providing flow based load balancing.

BACKGROUND OF THE INVENTION

All of today's important business and consumer applications rely on communications infrastructures such as the Internet. Businesses and consumers may have multiple servers for communicating among various locations, for handling customer requests, transactions etc. A front-end load balancer can be used to balance the requests among the various servers and determine which server should handle the next request.

There are a variety of load balancing methods that balance an offered load based on network topology and routing information. For example, round robin, weighted round robin, Hypertext Transfer Protocol (HTTP) header-based, response time, Internet Protocol (IP) address hashing, Uniform Resource Locator (URL)-hashing, etc. However, these load balancing methods are based only on network topology and routing information. The real state of the network is not taken into account and all the existing paths are not made available in the routing table. Furthermore, if preference is allowed in the load balancing method, the preferred path cannot be chosen on a per flow basis but, instead, is assigned randomly by computing the hashing. The computation of hashing doesn't take into account the network's real state (e.g., a current status) for the different paths. Thus, existing load balancing methods imply that the route metrics on the different paths are identical and the flows are to be distributed randomly.

Therefore, there is a need for a flow based load balancing method that distributes load not only in accordance with topology and routing information but also accounts for a current status of the various paths.

SUMMARY OF THE INVENTION

In one embodiment, the present invention discloses a method and apparatus for flow based load balancing across a plurality of resources. For example, the present method receives at least one packet from a flow. If the flow has not being previously classified, then the flow is classified based on the characteristics of the flow. Once classified, the present method matches the flow to at least one matched path from a plurality of available paths in accordance with the characteristics of the flow and characteristics of the at least one matched path. Once matched, the present method forwards the packet from the flow to the at least one matched path for processing.

In one embodiment, classified flows are stored in a flow database and available paths are stored in a path database such that lookup operations can be performed using these two databases. In one embodiment, if the packet is not part of a classified flow, then the method may determine whether or not the packet characteristic corresponds to a classified similar flow. In one embodiment, the characteristics of the flow and/or the paths are periodically updated.

Thus, the present invention provides a load balancing method having the advantage of distributing the load on a per flow basis in accordance with matching the characteristics of the flow to the characteristics of a path. As the characteristics of the flow and the characteristics of the assigned or selected path are changed over time, the present invention allows dynamic assignment of a new path for the flow.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
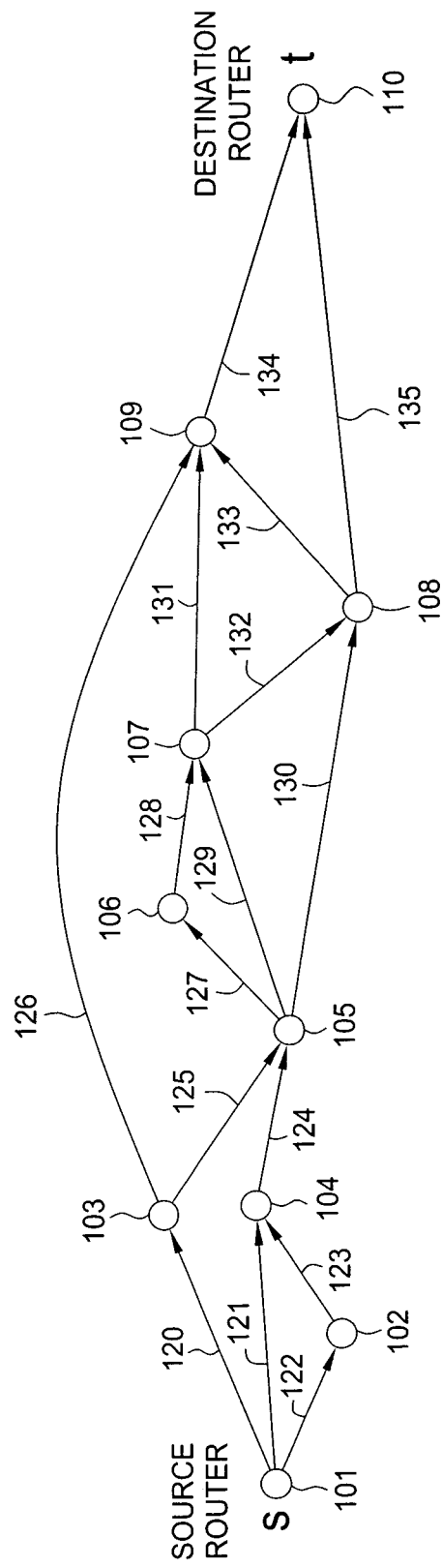
FIG. 1 illustrates an exemplary network with routers.

The present invention broadly discloses a method and apparatus for flow based load balancing. Although the present invention is discussed below in the context of paths or routes, the present invention is not so limited. Namely, the present invention can be applied to any cluster or set of two or more resources e.g., two or more computers or servers, two or more storage devices or systems, two or more firewalls, two or more networks, two or more routers, two or more switches, two or more network services or two or more network devices, etc. For the purpose of scope, the term packet is intended to broadly include a record and can apply to any type of resource.

Since internet services are becoming ubiquitous, more and more businesses and consumers are relying on the internet for many applications. In r one example, a large business may have multiple servers for handling customer requests, transactions etc. In another example, a business may have multiple servers for communicating among various locations. A front-end load balancer may be used to balance the requests among the various servers (or communication devices) and to determine which server (or communication device) should handle the request based on network load.

There are a variety of load balancing methods that balance an offered load based on network topology and routing information. For example, such methods may include round robin, Hypertext Transfer Protocol (HTTP) header-based, Internet Protocol (IP) address hashing, Uniform Resource Locator (URL)-hashing, etc. However, these load balancing methods are based only on network topology and routing information. In other words, the real state of the network is not taken into account and all the existing paths are not made available in the appropriate routing table. Existing load balancing methods simply treat the different paths as identical paths regardless of the variations in the route metrics. Thus, the flows are distributed randomly across the paths regardless of the type of the flows. For example, a data storage application (which is typically tolerant of delay) may be sent on a path that has less delay, while another flow that is sensitive to delay is sent on a path with significant delay. Therefore, there is a need for a flow based load balancing method that distributes dynamically the load according to routing information and a current status of various available paths.

In order to better describe the invention, the following terminologies will first be provided:
Load balancing;
Flow; and
Similar flow.

Load balancing refers to a method for distributing loads. In one embodiment within the context of a router, load balancing refers to a method for distributing loads via at least two different paths (e.g., as listed on a routing table) to a destination. The process or module in the router that performs the load balancing function is referred to as a "load balancer." The load balancing among multiple paths can be based on standard routing protocols such as Open Shortest Path First (OSPF), static route, etc. The multiple paths may have different distances, routing cost, etc. This is an improvement compared to current load balancing methods which may only use paths having the same routing cost. The load balancing may be performed per destination or per packet. Per destination load balancing refers to the router distributing the packets based on the destination addresses. Per packet load balancing refers to the router sending one packet for a specific destination over the first path, the second packet for the same destination over the second path, and so on.

A flow may refer to a sequence of packets having the same source and destination addresses, common higher-level protocol types (e.g., UDP, TCP, etc.), common Type of Service (TOS), and/or common Internet Protocol (IP) precedence as indicated in the IP packet header. In one embodiment, a flow can be classified in accordance with several criteria and rules. For example, each criterion may be associated with a characteristic such as throughput, class of service, jitter, delay or latency, available bandwidth, packet loss, etc. In one embodiment, throughput refers to a measure of the amount of data transferred in a specific amount of time. In one embodiment, class of service refers to a level of service for a flow or a set of flows. In one embodiment, latency refers to the delay in routing packets. In one embodiment, jitter refers to a measure of the variability over time of the latency across a network. In one embodiment, bandwidth refers to a measure of the capacity of a communications channel or connection. In one embodiment, packet loss is a measure of the number of lost packets, e.g., due to congestion. It should be noted that the present invention is not limited to this list of criteria.

The rules may be defined by a network administrator. For example, a network administrator may set levels 0 to 4 for each criterion (e.g., 4 being the highest level). The range of levels may be modified to match customer or network administrator specifications.

In one embodiment, routers may maintain a Flow Database (FDB) that contains a plurality of classified flows along with the flows' characteristics. For example, a flow with 3 criteria and 5 levels may get the following table (matrix) in the database:

| Flow | Level for criterion A | Level for criterion B | Level for criterion C |
|---|---|---|---|
| Flow 1 | 0 | 2 | 1 |

A "similar flow" refers to a flow with the same destination address and same criteria but the source addresses and protocol types can be different from a referencing flow.

FIG. 1 illustrates an exemplary network 100 with routers 101 through 110. Traffic from router 101 (e.g., a source router) flowing towards router 110 (e.g., a destination router) may traverse over any of the arcs 120 through 135 depending on the weight of each arc. For example, traffic originating from source router 101 may flow over arcs 121, 124, 130 and 135 to reach destination router 110. For clarity in the description below, the source router 101 will be referred to as router s and the destination router 110 will be referred to as router t.

In one embodiment, the routers utilize routing protocols to choose a path for transmitting the data. For example, routers may use the OSPF protocol. In OSPF, an integer weight can be assigned to each arc such that each router in the network is made aware of the weight assignments. Each router computes a graph of shortest weight paths from itself to every other router in the network for a given demand. Traffic can then be routed on the shortest weight paths. For the network above, traffic leaving router s with destination router t will traverse on the shortest path from router s to router t. It should be noted that a router will typically continue to forward traffic on the shortest path regardless of congestion levels, status, etc.

The information used by the routing protocol (OSPF) for determining the shortest path may come from the lowest three layers of the Open System Interconnect (OSI) protocol stack. Note that the Internet protocol and the layer that define the packet delivery are in the third layer of the OSI stack. The upper layers of the OSI stack which constitute the layer 4/5 in the network procedures are not used to build the routing table in OSPF. These upper layers define the applications such as the Transmission Control Protocol (TCP) or the User Datagram Protocol (UDP).

Recall that the routing table is updated by dynamic routing protocols such as OSPF, Border Gateway Protocol (BGP), etc. For each destination, the routing protocol defines at least one route. However, one aspect of the present invention is to define several routes in order to select the most appropriate route for a particular flow. In addition, several protocols may be used to generate different available routes as each protocol may use its own metric to build routes. For example a mix of several routes provided by OSPF and BGP may be merged in the global routing table as well as Static routes. Once all the routes have been determined, a Routing Table (RT) can be generated that represents a superset of all routing information. It should be noted that the most appropriate route for a flow is not necessarily the best from the perspective of only considering routing weight or cost. In addition, in some instances it is possible to obtain more than one preferred route for a destination.

In one embodiment, the load balancer maintains a Path Database (PDB) that tracks the characteristics of each of the routes listed on the Route Table. For example, the characteristics may be premised on criteria such as throughput, class of service, latency, packet loss, bandwidth, jitter, etc. It should be noted that these criteria are only examples and the present invention is not limited only to these criteria. In one embodiment, the Path Database is populated by analyzing each route on the Routing Table. For example, the criteria comprising throughput, class of service, latency, packet loss, bandwidth, jitter can be analyzed for the path comprising the arcs of 121, 124, 130 and 135 and so on for other paths. Once the analysis is completed, the characteristics of each route is then stored in the Path Database.

In one embodiment, the current invention checks the path characteristics regularly to update the database. For example, the path criteria or metrics may be updated periodically, e.g., every 15 minutes, hourly, daily and so on.

In one embodiment, the Path Database is used for both path assignment on new flows and reassignment of existing flows. The process of reassigning existing flows to new paths is called "dynamic assignment." In a dynamic assignment, a flow may use a default path first and then an analysis of all end-to-end possible paths may follow. The process then checks whether or not the flow should be switched to a new path. The switching to the new path can be performed when necessary (with some delay between packets at switching time to avoid sequence errors).

A path or a route is classified following similar rules used to classify a flow. Once classified, the present method may then select a path (e.g., broadly defined as a matched resource) that has the closest characteristics that will be best suited for a particular flow. If all criteria of one or more paths match a flow, e.g., having the same values, then the first path from among the matched paths is selected. If no single path is a perfect match to a particular flow, then the method determines which path has the characteristics that are the closest to the flow.

In one embodiment, the present method first identifies the paths that have a better value on all fields and then identifies the path that has the closest difference when compared to a particular flow. If none is found, then a lower quality path is identified with again the lowest possible difference when compared to a particular flow. The rules that are used to associate a particular path with a route are defined by a network administrator in accordance with implementation specific requirements. For example, the level range may be modified to match with the network or customers specifications.

To illustrate, a matrix having a plurality of paths and a flow may be illustrated in the table 1 below:

TABLE 1

| Path | Level for criterion A | Level for criterion B | Level for criterion C |
|------|----------------------|----------------------|----------------------|
| P1   | 1                    | 0                    | 1                    |
| P2   | 2                    | 1                    | 2                    |
| P3   | 1                    | 2                    | 1                    |
| F1   | 1                    | 2                    | 1                    |

The path analysis calculates the best path, PMax, for a flow F1. In one embodiment, for each path the method determines the difference between the path and the flow while considering only the path criteria that are lower than the flow criteria. In other words, in one embodiment, it may not be necessary to consider how well a path exceeds one or more criteria of a flow. In contrast, the fact that a particular path fails to meet one or more criteria of a particular flow is more relevant and important in the path selection process. In one embodiment, the Path/Flow difference D is calculated by using basic one to one subtraction and taking the absolute value. Using the example shown in Table 1, the difference D for Path 1 is 2; the difference D for Path 2 is 1; and the difference D for Path 3 is 0. Since Path 3 has the lowest difference D, it will be selected for flow F1.

It should be noted that although path P2 appears to have two criteria that are superior than path P3 when compared to flow F1, path P3 is still a better match for flow F1. The reason is that the failure of path P2 to meet one of the criteria of flow F1 is more important than the fact that path P2 exceeds two of the criteria of flow F1. However, in one alternative embodiment, exceeding the criteria of a flow can be used as a supplemental selection parameter.

In practice, multiple paths may have the same Path/Flow difference D for a particular flow. In such situation, the method may select one of the paths based on other criteria, e.g., a path with the best throughput (T) for the same calculated difference D. In one embodiment, the path with the highest throughput is preferred and then it is defined as PMax for a flow.

In one embodiment, the Flow Database (FDB) stores the definitions of the active flows for a specific period. The information associated with the flow such as criteria, Path PMax, etc. are also stored. In one embodiment, a statistical variable is also associated with the flows in order to get the real throughput. The statistical variable is calculated periodically (for example between 1 and 5 minutes). For dynamic path updates of flows, the present method may also select which of the flows should have a path reassignment.

In one embodiment, a dual step mechanism is used to first classify the running flows with the bandwidth real usage versus planned usage (required bandwidth at the beginning of the flow). The flows with significant difference between the expected and real bandwidth usage are identified and re-entered in the classification process. In addition, for flows in progress with criteria not matching the initial flow, the statistics is measured and a path recalculation is performed in order to conform.

When a packet of a flow arrives at the Load Balancing (LB) process, the process checks if the flow or a "similar flow" is already defined in the Flow DB (FDB). If it is, then the forwarding information (e.g., information as to which path to use for forwarding the flow) is sent to the LB process. If the flow is not defined, the Load Balancing process requests the best paths for the flow and then sends the flow to the appropriate path. In parallel, the LB process may update the Flow Database (FDB) and the Forwarding Table (FWT).

In one embodiment, the Forwarding Table (FWT) contains information as to how a flow is to be forwarded, i.e., which path or paths will be used to forward a flow. Specifically, the Forwarding Table contains a listing of all classified flows and their current path assignments. It should be noted that although the present invention discloses the use of various tables (e.g., routing table and forwarding table) and databases (e.g., path database and flow database), the present invention is not so limited. Namely, additional tables can be used or various tables and databases can be merged.

Figure 2:
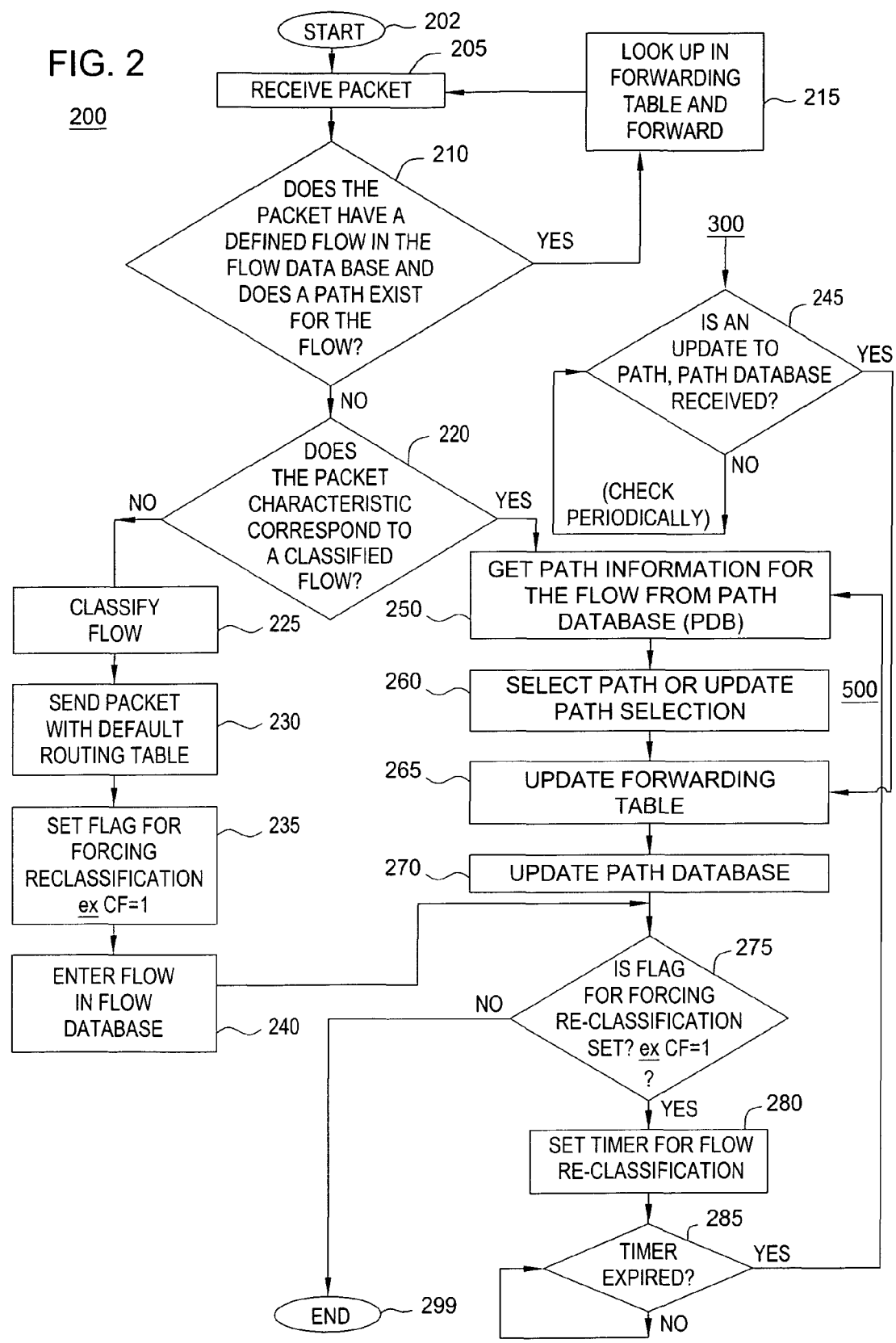
FIG. 2 illustrates a flowchart of a method for flow based load balancing of the present invention.

FIG. 2 illustrates a flowchart of a method 200 for flow based load balancing. In one embodiment, the method 200 may have several entries as it receives and classifies incoming packets. Classifying or defining a flow comprises evaluating the characteristics of the flow, e.g., deducing the flow's actual characteristics or simply assigning a predicted or default characteristics until actual measurement can be made on the flow. The method also updates the flow forwarding information including the path to be used for a classified flow. The updating of flow forwarding information may be performed either at the initial detection of a new flow, after some predefined time chosen for refreshing the paths being used, or whenever there is a change in the network that may impact the path characteristics.

Method 200 starts in step 202 and proceeds to step 205. In step 205, method 200 receives one or more packets to be analyzed and forwarded via a flow based load balancer. The packet may belong to an existing flow or it may be the start of a new flow of packets. Method 200 proceeds to step 210 to determine whether or not the packet has a defined flow and at least one assigned path.

In step 210, method 200 determines whether or not the packet has a defined flow in the Flow Database (FDB) and a path that exists for the defined flow. If the received packet is part of a classified flow in the Flow Database and an associated path exists for the classified flow, then the method proceeds to step 215. Otherwise, the method proceeds to step 220.

In step 215, method 200 looks up in the flow Forwarding Table (FWT) for the selected path or paths that have been defined for the classified flow and the received packet is then forwarded in accordance with the defined path(s). The method then proceeds back to step 205 to receive more packets.

In step 220, method 200 determines whether or not the packet characteristic corresponds to a classified flow. Namely, when the packet is not associated with a defined flow in the flow database, the method checks to determine if the packet characteristics correspond to another pre-classified flow. In other words, there may be information pertaining to the received packet that will allow the method to make a prediction as to its characteristics, e.g., predicting that the flow will behave or has requirements that are similar to another previously classified flow. One illustrative example may be that flows from the same enterprise customer may behave similarly. In one embodiment, a flow may be characterized by several information fields within the IP packet. For example, a flow may be characterized by source/destination IP addresses, by port type such as User Datagram Protocol (UDP), Transmission Control Protocol (TCP), etc., by protocol type such as File Transfer Protocol (FTP), Hypertext Transfer Protocol (HTTP), etc.

Thus, pre-classification refers to a short cut method that quickly defines the flow requirements based on a single received packet because the flow behavior is presumed to be known based on its similarity to an existing flow. In one example, the flow behavior may be known because it is a known customer application that requires previously defined characteristics for latency, bandwidth or jitter. In another example, the flow behavior may be known because the packet is using a protocol with set static characteristics. An example is Internet Control Message Protocol (ICMP) for which either a data path for another type of flow exists, and the mechanism forces using the same path, or no path exists and the default route is used. The reason is that ICMP used by commands such as "ping" are used to assess the path for other data flows and need to use the same path. Thus, no specific path needs to be defined for ICMP, unless specifically defined by other pre-classification rules. If the packet characteristics correspond to a classified flow, the method proceeds to step 250. Otherwise, the method proceeds to step 225.

In step 225, method 200 analyzes and classifies the flow. Specifically, based upon information associated with the received packet, the flow is classified. For example, a flow may be classified based on its source IP address, its destination IP address, its protocol and the like.

In step 230, the packet may be optionally forwarded using a default forwarding mode. For example, the default mode may simply use the active IP routing table without specific forwarding rules. The method then proceeds to step 235.

Note that at the end of step 230, the characteristics of the newly received flow are not fully understood. In one embodiment, in order to assess the requirements for bandwidth, jitter, etc., the present method allows the flow to run for a period of time. The flow's characteristics, e.g., jitter, latency, and throughput, may then be calculated after statistics on how packets are forwarded have been collected. Some characteristics such as latency may be difficult to assess accurately using only a few packets, but these criteria may be initially assigned based on rules associated with protocols. In one embodiment, the method performs a partial pre-classification to determine some characteristics such as latency. When the characteristics of the flow are not fully understood, the flow is stored in the flow database along with an expiration time to redo the classification. This re-classification process will provide a more accurate characteristics profile for the flow.

In step 235, method 200 sets a flag for reclassification. For example, the Classification Flag (CF) may be set to "1" to indicate the need to perform the reclassification and to "0" otherwise. The process of reclassification may be a full reclassification (e.g., measuring all criteria for the flow) or it may only be a partial reclassification (e.g., measuring only a subset of all the criteria for the flow). As more and more volume of packets is analyzed, the classification of the flow will be better defined. The service provider or network operator determines the volume of packets to be analyzed for initial classification, partial pre-classification, full classification, etc. The method then proceeds to step 240.

In step 240, method 200 enters the flow into the flow database. Namely, all the criteria associated with the newly received flow are entered into flow database. In one embodiment, the flow may be entered along with the classification flag to indicate whether a reclassification for the flow will be necessary in the future. The method then proceeds to step 275.

Returning to step 250, method 200 obtains path information for the flow from the path database. For example, if a new flow is detected and the new flow is determined to be similar to another previously defined flow, then the path information associated with the similar flow will be obtained for the new flow. Alternatively, if step 250 is triggered for an existing flow, then it is likely that a reclassification has been requested. In this scenario, a plurality of available paths that can be used for the existing flow is obtained. Namely, a recalculation against each of the available paths will be performed.

Figure 5:
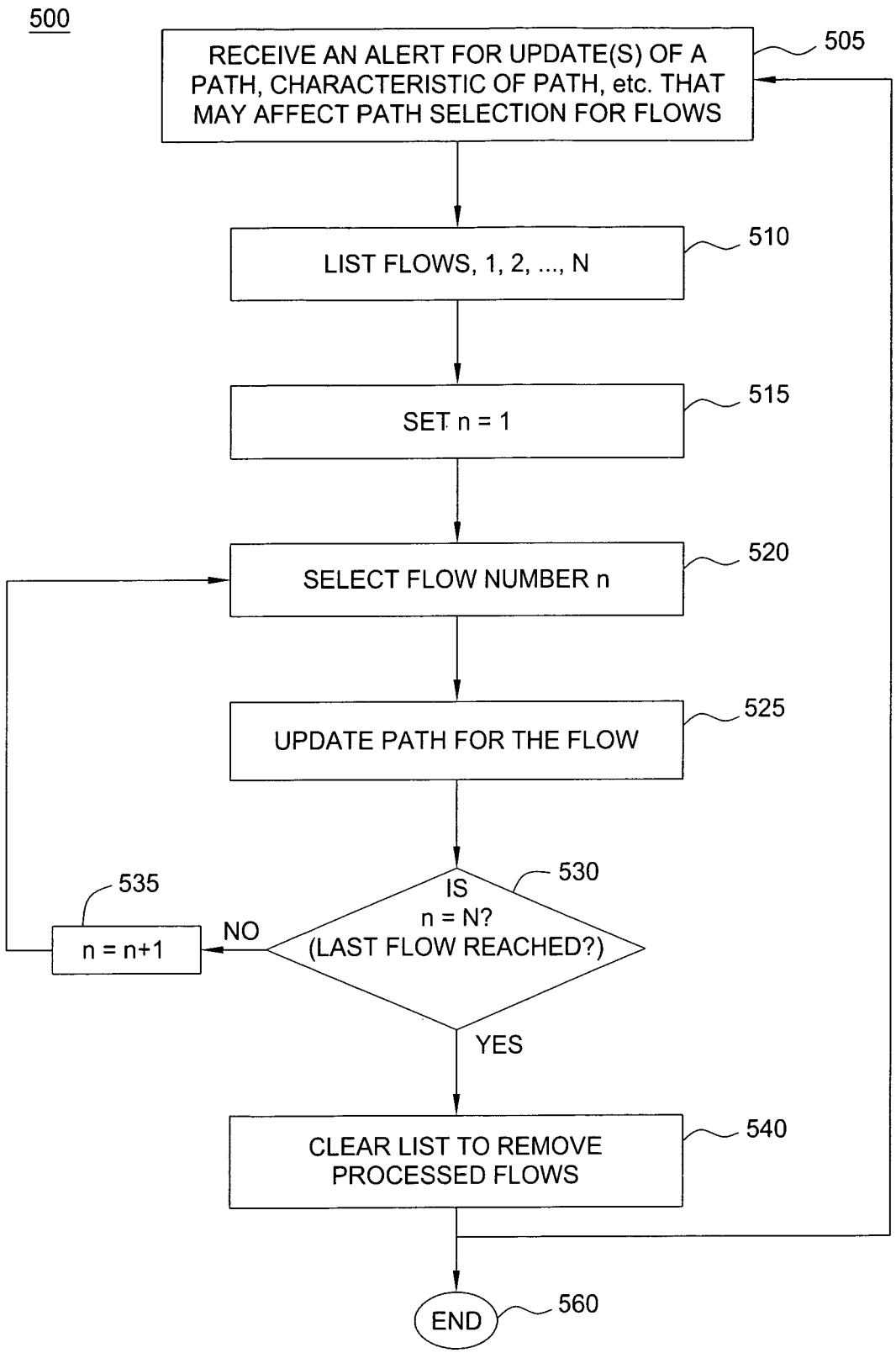
FIG. 5 illustrates an exemplary embodiment of a method for selecting a path for a flow.

In step 260, method 200 selects a path or updates a path selection. The path selection is based on matching the flow characteristics with the characteristics of at least one path stored in the path database. For example, a path/flow difference D calculation can be performed as discussed above. For example, if reclassification has been triggered, then statistics (e.g., measured latency, throughput rate, jitter) for a flow may now be available to better assess the characteristics of the flow. Furthermore, FIG. 5 illustrates one embodiment of a method to implement step 260 below.

In step 265, method 200 updates the Forwarding Table (FWT). Specifically, a selected path or an updated path for the flow is recorded in the Forwarding Table. As such, subsequent packets from for the same flow can be properly forwarded via step 215 by looking up the assigned path in the FWT. The method then proceeds to step 270.

In step 270, method 200 updates the Path Database (PDB) to record the impact of the flow being associated with a selected path. For example, assigning a flow to a path will impact characteristics of the selected path, e.g., the bandwidth or throughput of the path may be negatively impacted. Similarly, removing a previously classified flow from a path will impact characteristics of the deselected path, e.g., the bandwidth or throughput of the path may be positively impacted and so on. Consistent and timely updating of the path database will enable the process to react rapidly if and when there is a critical or major change in the path behavior.

In step 275, method 200 determines whether or not the flag for forcing the reclassification is set. For the above example, the method determines if the flag CF value for the flow is set to "1". If the flag is not set to "1", the method ends in step 299. Otherwise, the method proceeds to step 280.

In step 280, the method sets a timer or a counter for flow reclassification. For example, the method may set a time-based or counter-based trigger to implement partial or full re-classification. For example, the timer can be based on a predefined time period, e.g., 30 seconds, one minute and so on, or it can be based on the number of received packets for a particular flow, e.g., 20 packets, 50 packets and so on.

In step 285, method 200 determines whether or not the timer has expired or a count has been met. If the timer expired or the count has been met, then the method proceeds to step 250 to get the path information from the PDB. Otherwise, it continues to monitor the time or count.

It should be noted that method 200 may have multiple entry points, e.g., method 300 as discussed below may trigger an update event. Namely, there may be instances where there are significant changes in the network that will impact how flows will be assigned to different paths. For example, changes may include by not limited to, adding a new arc, adding a new router, upgrading the capacity of an arc, downgrading the capacity of an arc, detecting failure of a router, detecting failure of an arc, detecting maintenance work being performed on an arc or a router, detecting severe congestion, detecting a network attack, and so on. Thus, in step 245, method 200 determines whether or not an update event is detected that may affect one or more paths stored in the Path Database. For example, there may be a network activity removing or degrading the performance of some routes, etc. If an update is detected, then the method proceeds to step 265. Otherwise, the method continues to check for updates.

Figure 3:
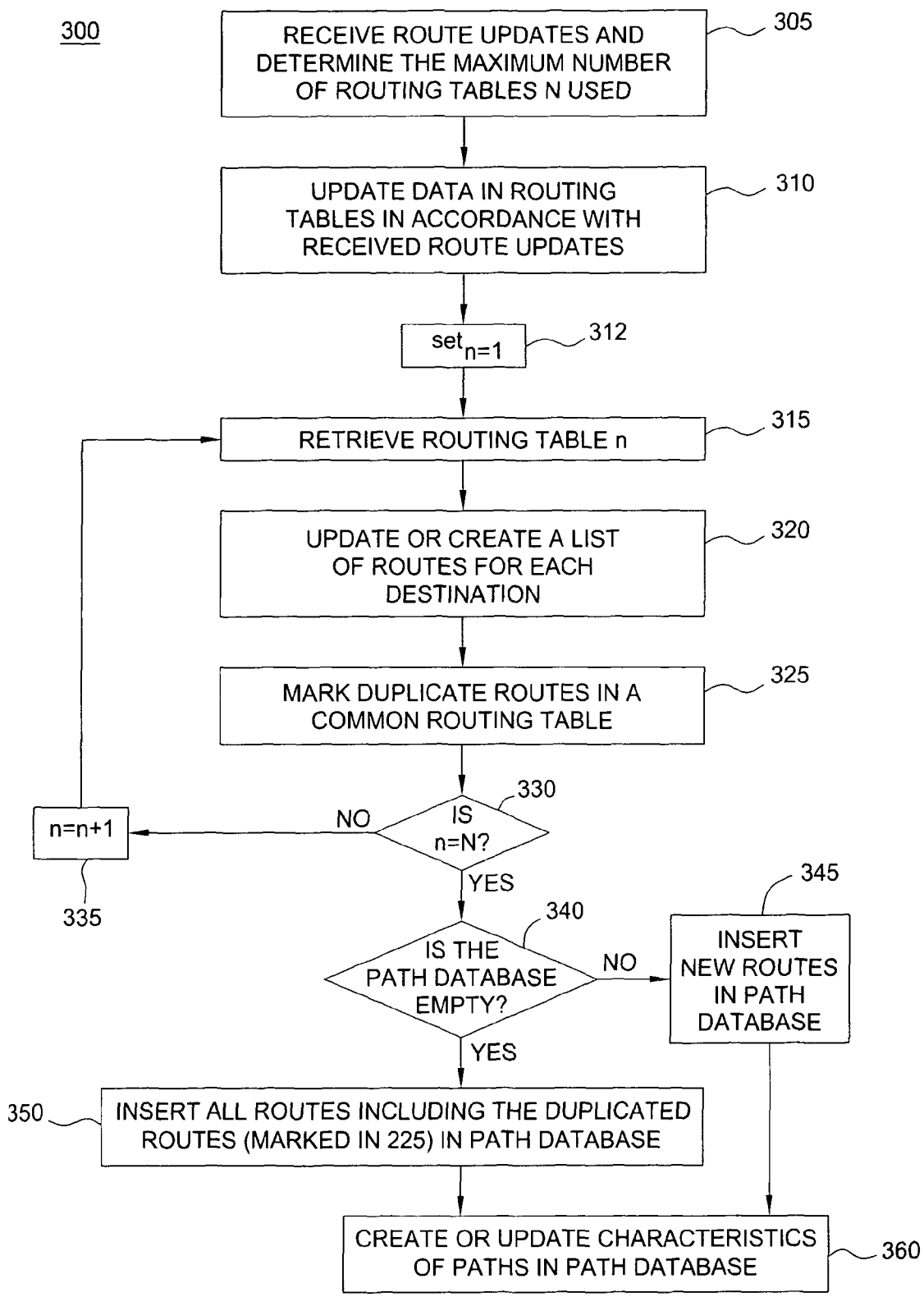
FIG. 3 illustrates an exemplary embodiment of a method for updating or creating a path database.

FIG. 3 illustrates an exemplary embodiment of a method 300 for updating or creating the path database. For example, the Path Database can be updated when new flows are assigned new paths or when network events occur, e.g., failures or new deployments of arcs and so on. It should be noted that it is contemplated that the network may support a plurality of different protocols simultaneously. As such, route updates are received by each routing protocol periodically and also when a network event occurs. In one example, there are N routing tables reflecting the different routing protocols that can be used.

In step 305, method 300 receives route updates and determines the number of routing tables N that are used. In step 310, method 300 updates the data in routing tables in accordance with received route updates.

In step 312, the method sets n=1 as an initialization step. In step 315, method 300 is then able to retrieve the routing tables one by one.

In step 320, method 300 updates or creates a list of routes for each destination. Namely, the update may have altered the paths to a particular destination, e.g., failure of an arc may reduce the number of paths to a destination, whereas adding a new arc or router may increase number of paths to a destination.

In step 325, the method then marks duplicate routes, e.g., in a common routing table. This step maintains the information pertaining to duplicate routes to a destination, thereby allowing the present invention to dynamically match the characteristics of a flow to the characteristics of a path due to changes in either the flow or in the assigned path. Without the knowledge of available duplicate paths, a forwarding method will not be able to quickly switch to another path even if changes to the flow or the assigned path are detected.

In step 330, the method determines whether or not the maximum number of routing tables (N) is reached. If it has been reached, all routing tables have been retrieved and the method proceeds to step 340. Otherwise, the method proceeds to step 335 to update n such that the next routing table may be retrieved. When all the routing tables have been retrieved, the method proceeds to step 340.

In step 340, method 300 determines whether or not the path database is empty. If the database is not empty, the method proceeds to step 345 to insert the new routes into the path database. Otherwise, the method proceeds to step 350 to insert all routes including the duplicate routes (as marked in step 325) in the path database. The method then proceeds to step 360.

In step 360, once all routes or paths have been identified, one or more of paths' characteristics can be measured or updated in the path database.

Figure 4:
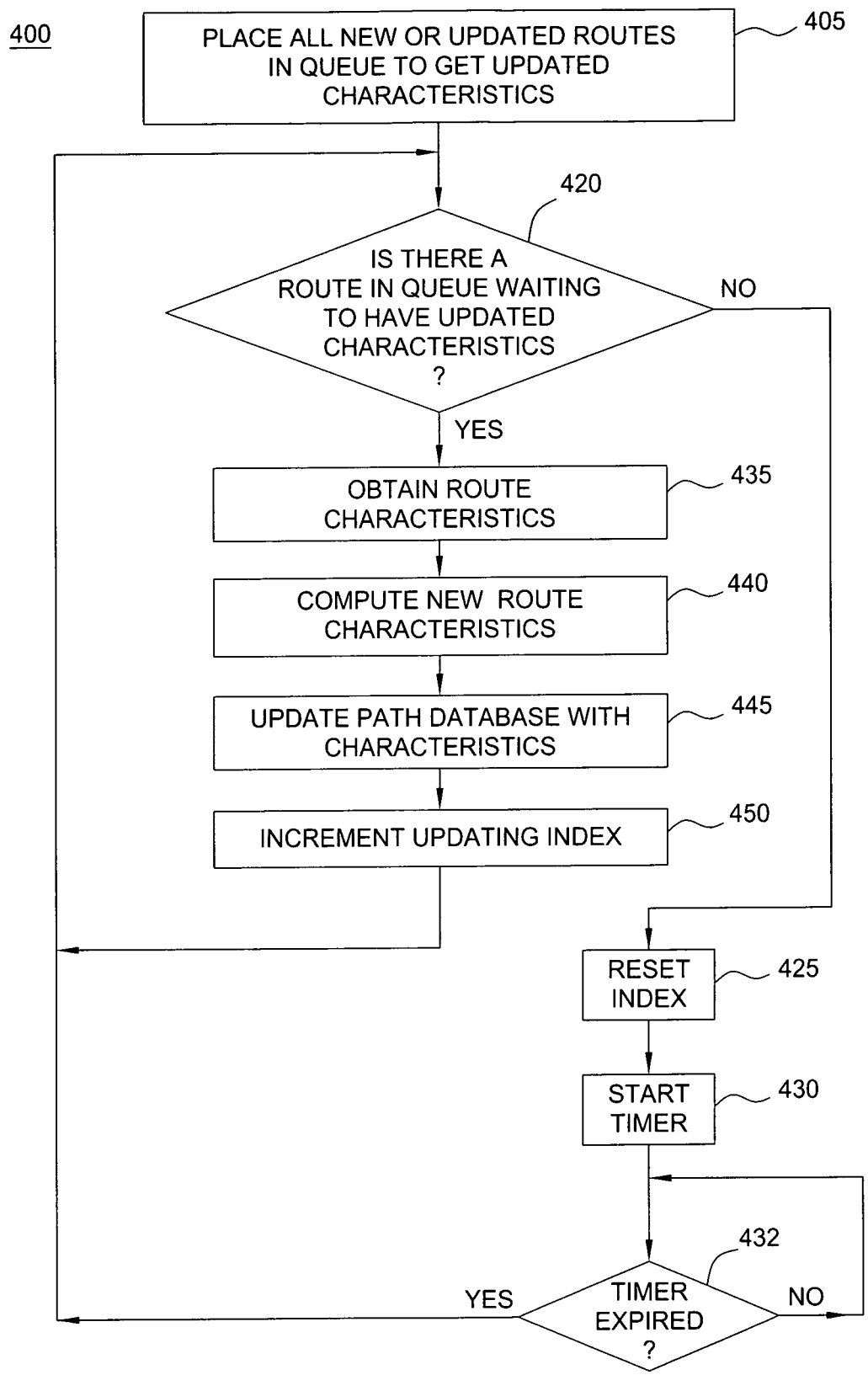
FIG. 4 illustrates an exemplary embodiment of a method for updating or creating the characteristics of a path.

FIG. 4 illustrates an exemplary method 400 (e.g., as deployed in step 360 of FIG. 3) for creating or updating the characteristics of the paths. For example, for each route entry in the Path Database, the method will define or update the characteristics associated with the path such as latency, jitter, packet loss, throughput, bandwidth, etc.

In step 405, method 400 places all new or updated routes in a queue to get characteristic updates. Each route has at least the following attributes: SRC (source), DEST (destination), Timestamp, protocol and metric. The method then proceeds to step 420.

In step 420, method 400 determines whether or not there is a route waiting in a queue for characteristics update. If the queue is empty, the method proceeds to step 425. Otherwise, the method proceeds to step 435.

In step 425, method 400 resets the index to indicate the fact that the queue is empty. The method then proceeds to step 430 to start the timer for checking the queue. The method then proceeds to step 432 to determine whether or not the timer expired. When the time expires, the method proceeds back to step 420 to re-check the queue, and so on.

In step 435, method 400 obtains route characteristics. For example, a request may be sent to a global server which manages a database containing all these statistics, e.g., latency measurements, packet loss data, throughput data and so on. In one embodiment, the global server may be designed for performing the reporting functions and may have the values available and stored locally. In an alternative embodiment, if a centralized reporting tool is not made available, then the server may need to poll individually the devices in each of the paths to dynamically acquire the values for the path characteristics.

The method then proceeds to step 440 and calculates the new route or path characteristics. The method then updates the path database with the newly updated characteristics in step 445. The updating index is then incremented in step 450 such that the next route in queue can be retrieved. The method then proceeds back to step 420 to determine whether or not there are more routes in the queue waiting for characteristic updates.

FIG. 5 illustrates an exemplary method 500 (e.g., as deployed in step 260 of FIG. 3) for selecting a path for a flow. The Path Database (PDB) contains the path information such as a list of paths and their characteristics. The selection of a path may be triggered by a number of different scenarios, e.g., detecting changes in a path that is currently in use for a classified flow, detecting changes in characteristics of a classified flow, detecting a new flow, etc. For example, the modification of one the following parameters in a path: route change, delay, bandwidth or cost update may generate an alert. Based on this alert, flows that are supported by the affected path may need to be evaluated to determine whether the changes to the characteristics of the affected path will warrant new path assignments.

In step 505, method 500 receives an alert for update(s) of a path, characteristic of a path, etc. that may affect path selection for flows. The method then proceeds to step 510 and creates a list of flows that may be impacted based on the alert. For example, the method determines the number of flows N, and assigns flow numbers sequentially (e.g. 1, 2, 3, . . . , N).

In step 515, the index for selecting a path for a flow is initialized. For example, the index "n" is set to one to begin the selection of a path for the first flow. In step 520, method 500 selects one flow for selecting a path. For example, flow number "n" may be selected.

In step 525, method 500 updates the path for the selected flow (e.g., flow number "n"). For example, this step may execute the recomputation of the path/flow difference D for the flow against all available paths. Since the characteristics of the assigned path may have changed, it is possible that an alternate path will now be better suited to the characteristics of the flow.

In step 530, method 500 determines whether or not n=N, i.e., whether the last flow is reached. If the maximum number of flows "N" is not achieved, then the index n is incremented by one in step 535 by setting "n=n+1." The method then proceeds back to step 520 to select the next flow.

It should be noted that as new path assignments are made, it is possible that the list of impacted flows may continue to grow. For example, if a path, e.g., P1, has failed, then it is likely that flows supported by the failed path P1 will be reassigned to other paths, e.g., P2 and P3. However, such reassignments may impact the characteristics of the paths P2 and P3, thereby triggering reclassification of flows that are currently being supported by the paths P2 and P3. This potentially may create a cascading effect. As such, in one embodiment, the method may lock the flow list to avoid new inputs if a cascading effect is detected. For example, during major system outages, it may be necessary to deal with updates for failed paths due to the outages prior to handling individual path changes for marginal improvements.

In step 540, method 500 clears the list of flows to remove processed flows. For example, when paths are assigned to all N flows in the list, then the list is cleared. New entries may then start from 1 when new alerts are received in step 505. Method 500 then proceeds to step 505 to receive new alerts or to step 560 to end the current process of selecting paths for flows.

Figure 6:
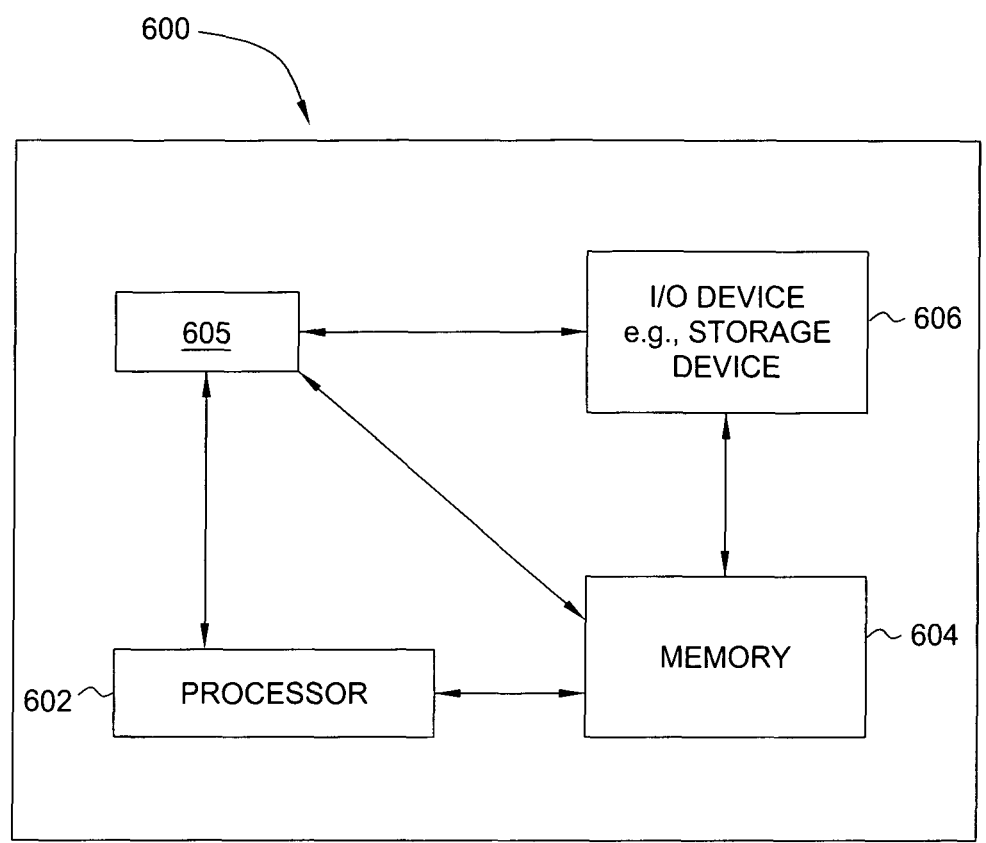
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a flow based load balancer module 605, and various input/output devices 606 (e.g., network interface cards, such as 10, 100, or Gigabit Ethernet NIC cards, Fibre Channel Host Bus Adapters, Infiniband adapters, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, or entirely in hardware, e.g., using application specific integrated circuits (ASIC), a general purpose computer or any other hardware equivalents. In one embodiment, the present flow based load balancer module or process 605 can be loaded into memory 604 and executed by processor 602 to implement the functions as discussed above. As such, the present flow based load balancer method 605 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a flow of packets, comprising:
    receiving, via a processor, a packet from the flow;
    classifying, via the processor, the flow based on characteristics of the flow;
    matching, via the processor, the flow to a matched resource from a plurality of presently available resources in accordance with the characteristics of the flow and characteristics of the matched resource, wherein the characteristics of the flow and the characteristics of the matched resource comprise a throughput, wherein the characteristics of the flow and the matched resource further comprise a packet loss parameter, wherein the matched resource comprises a path, wherein the matching comprises computing a difference between the characteristics of the flow and characteristics of each of a plurality of available paths, where the path is selected based on a lowest difference, wherein the difference between the characteristics of the flow and characteristics of each of a plurality of available paths only accounts for path criteria that are lower than flow criteria; and
    forwarding, via the processor, the packet from the flow to the matched resource for processing.

2. The method of claim 1, wherein the matched resource further comprises a network device.

3. The method of claim 1, wherein the classifying of the flow is performed periodically.

4. The method of claim 1, further comprising:
    updating the characteristics of the matched resource periodically.

5. The method of claim 1, further comprising:
    updating the characteristics of the matched resource in response to a network update.

6. The method of claim 1, further comprising:
    matching the flow dynamically to another matched resource if the characteristics of the flow and characteristics of the another matched resource is a better match when compared to characteristics of the matched resource.

7. A non-transitory computer-readable medium storing a plurality of instructions which, when executed by a processor, cause the processor to perform operations for processing a flow of packets, the operations comprising:
    receiving a packet from the flow;
    classifying the flow based on characteristics of the flow;
    matching the flow to a matched resource from a plurality of presently available resources in accordance with the characteristics of the flow and characteristics of the matched resource, wherein the characteristics of the flow and the characteristics of the matched resource comprise a throughput, wherein the characteristics of the flow and the matched resource further comprise a packet loss parameter, wherein the matched resource comprises a path, wherein the matching comprises computing a difference between the characteristics of the flow and characteristics of each of a plurality of available paths, where the path is selected based on a lowest difference, wherein the difference between the characteristics of the flow and characteristics of each of a plurality of available paths only accounts for path criteria that are lower than flow criteria; and forwarding the packet from the flow to the matched resource for processing.

8. The non-transitory computer-readable medium of claim 7, wherein the matched resource further comprises a network device.

9. The non-transitory computer-readable medium of claim 7, wherein the classifying of the flow is performed periodically.

10. The non-transitory computer-readable medium of claim 7, further comprising:

updating the characteristics of the matched resource periodically.

11. The non-transitory computer-readable medium of claim 7, further comprising:

matching the flow dynamically to another matched resource if the characteristics of the flow and characteristics of the another matched resource is a better match when compared to characteristics of the matched resource.

12. An apparatus for processing a flow of packets comprising:

a processor; and a computer-readable medium storing a plurality of instructions which, when executed by the processor, cause the processor to perform operations, the operations comprising:

receiving a packet from the flow;

classifying the flow based on characteristics of the flow;

matching the flow to a matched resource from a plurality of presently available resources in accordance with the characteristics of the flow and characteristics of the matched resource, wherein the characteristics of the flow and the characteristics of the matched resource comprise a throughput, wherein the characteristics of the flow and the matched resource further comprise a packet loss parameter, wherein the matched resource comprises a path, wherein the matching comprises computing a difference between the characteristics of the flow and characteristics of each of a plurality of available paths, where the path is selected based on a lowest difference, wherein the difference between the characteristics of the flow and characteristics of each of a plurality of available paths only accounts for path criteria that are lower than flow criteria; and forwarding the packet from the flow to the matched resource for processing.

* * * * *